US012618573B2

(12) United States Patent
Chiu

(10) Patent No.: US 12,618,573 B2
(45) Date of Patent: May 5, 2026

(54) HUMIDIFIER WITH FOUNTAINING AND AROMA DIFFUSING FUNCTIONS

(71) Applicant: Pao-Tien Chiu, New Taipei City (TW)

(72) Inventor: Pao-Tien Chiu, New Taipei City (TW)

( * ) Notice: Subject to any disclaimer, the term of this patent is extended or adjusted under 35 U.S.C. 154(b) by 353 days.

(21) Appl. No.: 18/418,859

(22) Filed: Jan. 22, 2024

(65) Prior Publication Data

US 2025/0237395 A1 Jul. 24, 2025

(51) Int. Cl.

| | |
|---|---|
| ***F24F 6/02*** | (2006.01) |
| ***B01F 23/213*** | (2022.01) |
| ***F24F 6/12*** | (2006.01) |
| ***F24F 8/50*** | (2021.01) |
| ***F24F 11/00*** | (2018.01) |
| ***F24F 11/88*** | (2018.01) |
| *F24F 6/00* | (2006.01) |

(52) U.S. Cl.

CPC ............ *F24F 6/12* (2013.01); *B01F 23/2133* (2022.01); *F24F 8/50* (2021.01); *F24F 11/0008* (2013.01); *F24F 11/88* (2018.01); *F24F 2006/003* (2013.01); *F24F 2006/008* (2013.01)

(58) Field of Classification Search

CPC ............ F24F 6/12; F24F 8/50; B01F 23/2133

See application file for complete search history.

(56) References Cited

U.S. PATENT DOCUMENTS

| | | | |
|---|---|---|---|
| 9,572,323 | B2 | 2/2017 | Lipscomb et al. |
| 9,826,712 | B2 | 11/2017 | Lipscomb et al. |
| 10,264,761 | B1 | 4/2019 | Huang |
| 10,571,138 | B2 | 2/2020 | Chiu |
| 2014/0263722 | A1 | 9/2014 | Hsiao |

FOREIGN PATENT DOCUMENTS

CN 208794629 U * 4/2019

* cited by examiner

*Primary Examiner* — Robert A Hopkins

(74) *Attorney, Agent, or Firm* — MUNCY, GEISSLER, OLDS & LOWE, P.C.

(57) ABSTRACT

The invention provides a humidifier with fountaining and aroma diffusing functions, comprising a base provided with a water tank; a fountain unit comprising a water pump, water conduits and a water flow assembly; and a humidification unit. One water conduit leads water from the water tank, another one extends to reach the assembly. The assembly comprises at least one water outlet receiving and discharging water toward the water tank. A height level of the water outlet is higher than that of the water tank. The humidification unit comprises an auxiliary water tank placed in the water tank and comprising a water diversion port communicating with the water tank, an atomizer exposed in the auxiliary tank, a cap provided on the auxiliary tank, and a gas guide member corresponding to the auxiliary tank. The gas guide member comprises at least one exhaust port.

9 Claims, 6 Drawing Sheets

HUMIDIFIER WITH FOUNTAINING AND AROMA DIFFUSING FUNCTIONS

FIELD OF THE INVENTION

The invention relates to a humidifier, and more particularly to a humidifier with fountaining and aroma diffusing functions.

BACKGROUND OF THE INVENTION

Humidifiers (such as U.S. Pat. No. 10,571,138) are common household equipment. The humidifier changes the humidity of the environment by generating a large amount of atomized gas. However, humidifiers are completely different from common water-based aroma diffusers (such as U.S. patent NO. US2014/263722A1). Although both produce atomized gas, humidifiers, as the name implies, need to have the ability to change the ambient humidity. Furthermore, water-based aroma diffusers are smaller in size and have relatively less water, so they can only be used for diffusing aroma. Looking at the products on the market today, there is no product capable of changing the ambient humidity and diffusing aroma. Even if there is a product provided with both functions, the user needs to add essential oil to produce the effect. However, existing humidifiers adopt a single water tank design, and the water stored in the water tank is used for atomization and humidification. Although essential oil can be added to the water tank, since the humidifiers have a large water storage capacity, and there is no auxiliary water tank design, the aroma diffusion effect is limited after the essential oil is added. Furthermore, the periphery of the water tank is easily stained with the essential oil, which will become dirty after long-term use and is difficult to clean, leading to machine failure.

In addition to the above, the current visual design of a conventional humidifier revolves around the barrel shape, which is a common household appliance product and cannot provide a visual experience. Although the common desktop water flowing fountains (such as U.S. Pat. Nos. 9,572,323, 9,826,712, 10,264,761) can provide the visual experience and are popular among people with sleep disorders who use white noise to help them fall asleep, the water flowing fountains do not have the functions of humidification and aroma diffusion.

In view of the above problems, the applicant of the invention earnestly researches into providing a multifunctional humidifier that integrates fountain, aroma diffusion and visual experience, which is an environmentally friendly product capable of increasing an ambient humidity, improving air quality and soothing the body and mind to benefit the public.

SUMMARY OF THE INVENTION

A main object of the invention is to solve the problem of single function of conventional humidifiers.

In order to achieve the above object, the invention provides a humidifier with fountaining and aroma diffusing functions comprising a base, a fountain unit and a humidification unit. The base is provided a water tank and an equipment installation space, the fountain unit comprises a water pump disposed in the equipment installation space, a plurality of water conduits connected to the water pump, and a water flow assembly located in the water tank. One of the water conduits leads water from the water tank, and another one of the water conduits extends to reach the water flow assembly. The water flow assembly comprises at least one water outlet that receives flowing water and discharges it toward the water tank. A height level of the at least one water outlet is higher than that of the water tank. The humidification unit comprises an auxiliary water tank placed in the water tank, an atomizer disposed in the equipment installation space and partially exposed in the auxiliary water tank, a cap provided on the auxiliary water tank, and a gas guide member disposed corresponding to the auxiliary water tank and communicating with a space in the auxiliary water tank. The auxiliary water tank comprises a water diversion port communicating with a space inside the water tank, the auxiliary water tank is provided for dripping of at least one essential oil therein, the gas guide member comprises at least one exhaust port, and an exhaust direction of the at least one exhaust port is divergent from a water flow direction of the at least one water outlet.

In one embodiment, the water flow assembly comprises two upright columns and a lateral frame connecting with the two upright columns, one of the water conduits extends in one of the two upright columns, the lateral frame forms the water outlets, a water flow space communicated with the water outlets, and an interface for connecting with one of the water conduits and communicating with the water flow space.

In one embodiment, the base comprises at least one boss for providing assembly of the two upright columns.

In one embodiment, the auxiliary water tank is formed jointly by an annular wall stacked on the at least one boss and the boss, and the water diversion port is formed on the annular wall.

In one embodiment, the water flow assembly comprises a partition wall formed on the two upright columns, the gas guide member is a half shell, and the gas guide member and the partition wall jointly define an exhaust channel communicated with the exhaust port.

In one embodiment, the water flow space of the lateral frame is tank-shaped, and the gas guide member is formed with a shield covering the water flow space.

In one embodiment, the humidifier comprises a work management component disposed in the equipment installation space and connected to the water pump and the atomizer.

In one embodiment, the humidification unit comprises an air flow generating member disposed in the equipment installation space, and a ventilation pipe located in the auxiliary water tank, one end of the ventilation pipe corresponds to the air flow generating member, and another end thereof is located in the auxiliary water tank.

In one embodiment, the humidifier comprises a plurality of switches provided on the base, and the switches are used for generating at least one signal to control operation of the fountain unit and the humidification unit.

Through the foregoing implementation of the invention, compared with the prior art, the invention comprises the following characteristics: while generating an atomized gas, the humidifier of the invention is capable of providing an olfactory experience produced by aroma diffusion and the visual experience produced by fountaining. An experience provided by the humidifier is no longer singular, users are enabled to settle their souls and minds through multiple experiences and feelings. According to the invention, water in the water tank can be used as a supplement for atomization water in the auxiliary water tank. Furthermore, since the auxiliary water tank can only be communicated through the water diversion port, the essential oil added in the auxiliary water tank will not float and diffuse into the water tank to prevent oil stains from appearing on a periphery of the water tank and dirt from forming.

DETAILED DESCRIPTION OF THE PREFERRED EMBODIMENTS

Figure 1:
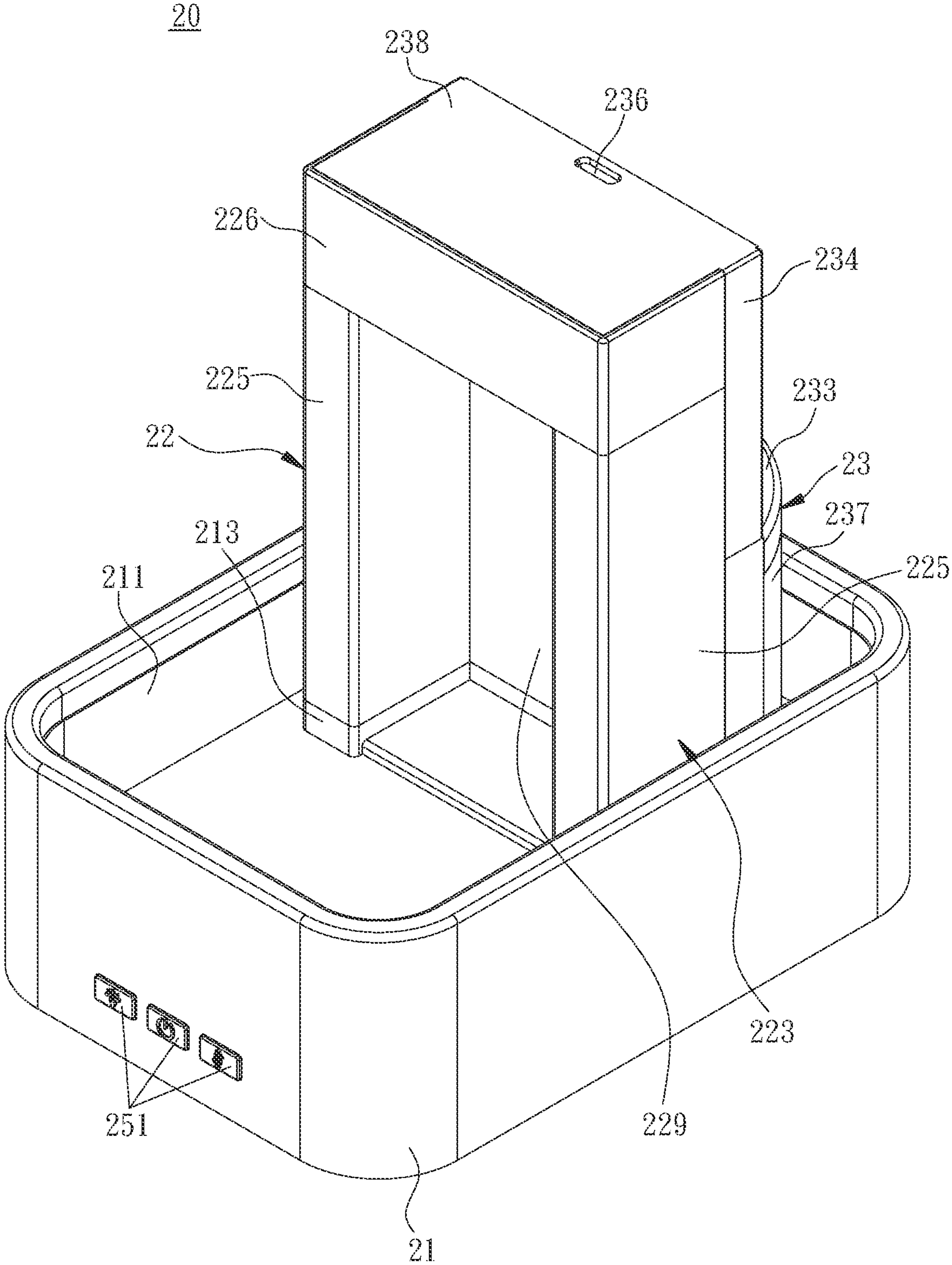
FIG. 1 is a perspective structural view of an embodiment of a humidifier of the invention.

The detailed description and technical content of the invention are described below with reference to the accompanying drawings.

Please refer to FIG. 1, FIG. 2, FIG. 3, and FIG. 4. The invention provides a humidifier 20. The humidifier 20 with fountaining and aroma diffusing functions. It should be understood that when the humidifier 20 is used, a humidity of an environment will be changed. The humidifier 20 comprises a base 21, a fountain unit 22 and a humidification unit 23. The base 21 forms a water tank 211 and an equipment installation space 212. A volume of the water tank 211 at least meets an amount of water required for humidification for a certain period of time. A volume of the water tank 211 can be designed according to implementation requirements. Shape or form of the water tank 211 is not limited to that drawn in the figures. In addition, the equipment installation space 212 is formed by the base 21 being hollow. The fountain unit 22 comprises a water pump 221, a plurality of water conduits 222, and a water flow assembly 223. The water pump 221 is disposed in the equipment installation space 212. The water conduits 222 are respectively connected to the water pump 221. One of the water conduits 222 leads water from the water tank 211, and another one of the water conduits 222 extends to reach the water flow assembly 223. The water flow assembly 223 comprises at least one water outlet 224. The at least one water outlet 224 receives flowing water lead from one of the water conduits 222 and discharges it toward the water tank 211. Further, a height level of the at least one water outlet 224 is higher than that of the water tank 211 to form a dripping or flowing spring-like effect. Furthermore, the water flow assembly 223 of the invention can be designed in a form that can be easily replaced by a user, so that the user can replace with the other water flow assembly 223 according to his or her own ideas.

On the other hand, the humidification unit 23 comprises an auxiliary water tank 231, an atomizer 232, a cap 233 and a gas guide member 234. The auxiliary water tank 231 is placed in the water tank 211 and capable of introducing water from the water tank 211. In one embodiment, the auxiliary water tank 231 comprises a water diversion port 235, and the water diversion port 235 is communicated with a space in the water tank 211. The atomizer 232 is disposed in the equipment installation space 212, and a portion of the atomizer 232 is exposed in the auxiliary water tank 231. Further, the portion of the atomizer 232 used for atomization is exposed in the auxiliary water tank 231 in order to atomize water in the auxiliary water tank 231. The cap 233 is disposed on the auxiliary water tank 231, and the gas guide member 234 is disposed corresponding to the auxiliary water tank 231 and communicates with a space in the auxiliary water tank 231. The gas guide member 234 comprises at least one exhaust port 236. The at least one exhaust port 236 is the only exhaust position of the humidification unit 23. An exhaust direction of the at least one exhaust port 236 is divergent from a water flow direction of the at least one water outlet 224. Further, a disposed position or an exhaust path of the at least one exhaust port 236 will not come in contact with a flow range of the at least one water outlet 224. Furthermore, the auxiliary water tank 231 of the humidification unit 23 of the invention is provided for dripping of at least one essential oil therein in order to produce aroma diffusion during implementation of atomization and humidification processes.

When the humidifier 20 of the invention is used, the humidification unit 23 activates the atomizer 232 to cause the atomizer 232 to atomize with the water in the auxiliary water tank 231. If the auxiliary water tank 231 has been added with the essential oil, when an atomized gas is discharged from the at least one exhaust port 236, the atomized gas will carry a fragrant smell. When the humidifier 20 is working and the fountain unit 22 is activated at the same time, the fountain unit 22 uses the water pump 221 to extract water in the water tank 211, and then discharges it from the at least one water outlet 224, forming a visual experience of fountaining. The water flow assembly 223 can further have an aesthetically pleasing design to enhance an overall visual experience of the humidifier 20.

In addition to the above, the water tank 211 and the auxiliary water tank 231 can be designed to prevent the essential oil added to the water from adhering to a periphery of the water tank 211 and causing dirt under long-term use, which is unfavorable to visual experience.

Figure 2:
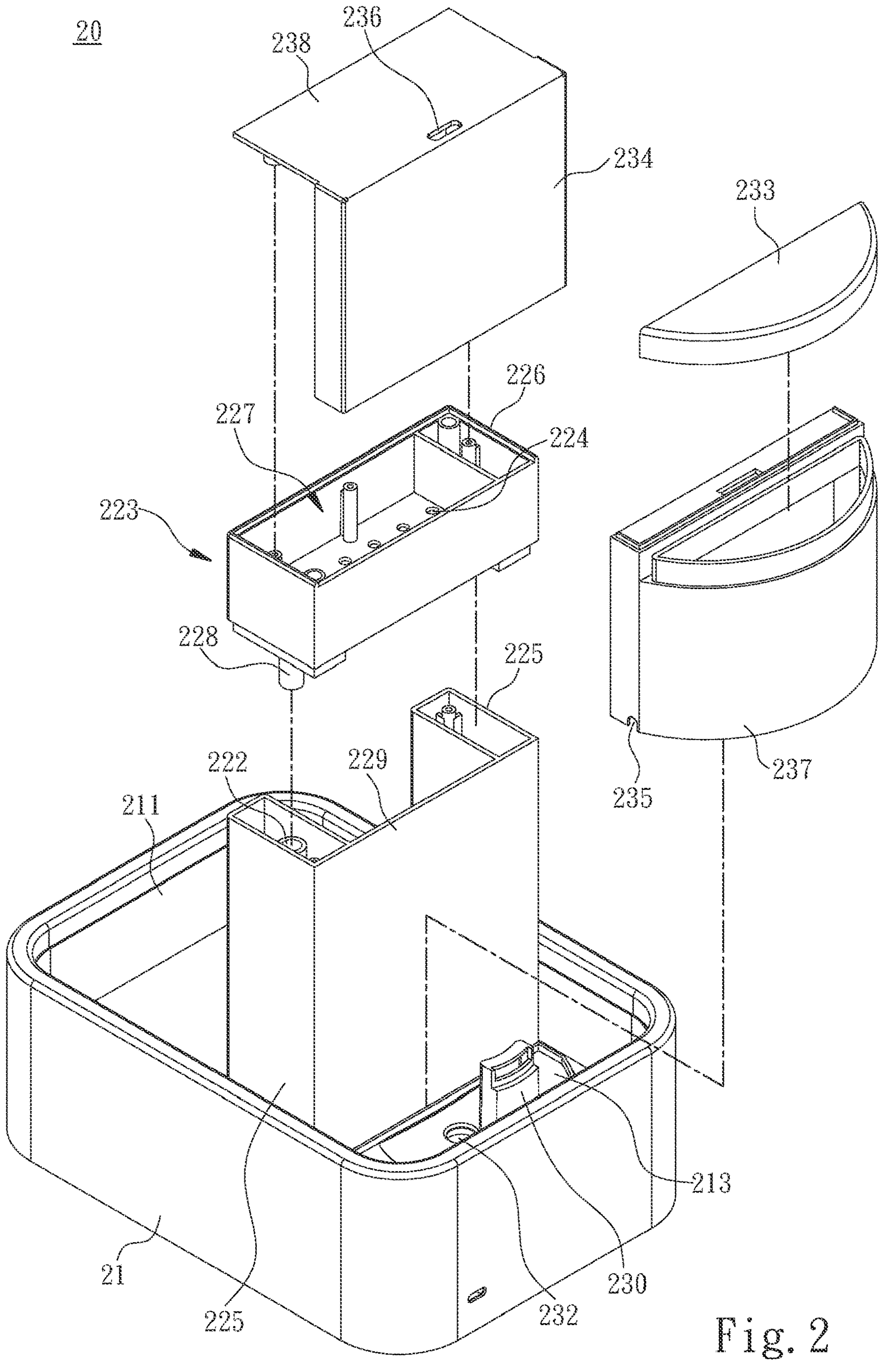
FIG. 2 is a perspective exploded structural view of an embodiment of the humidifier of the invention.
Figure 3:
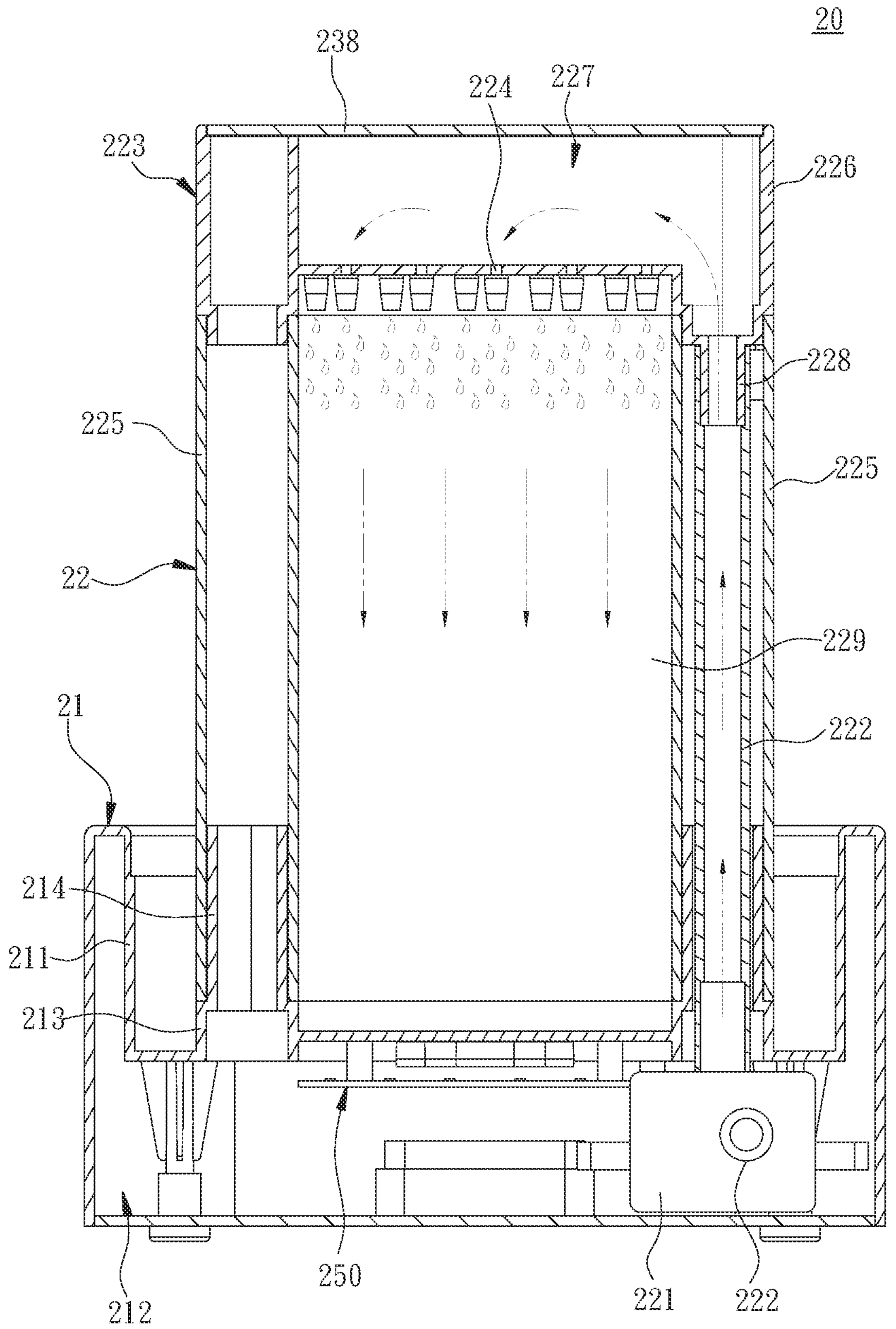
FIG. 3 is a first structural cross-sectional view of an embodiment of the humidifier of the invention.
Figure 4:
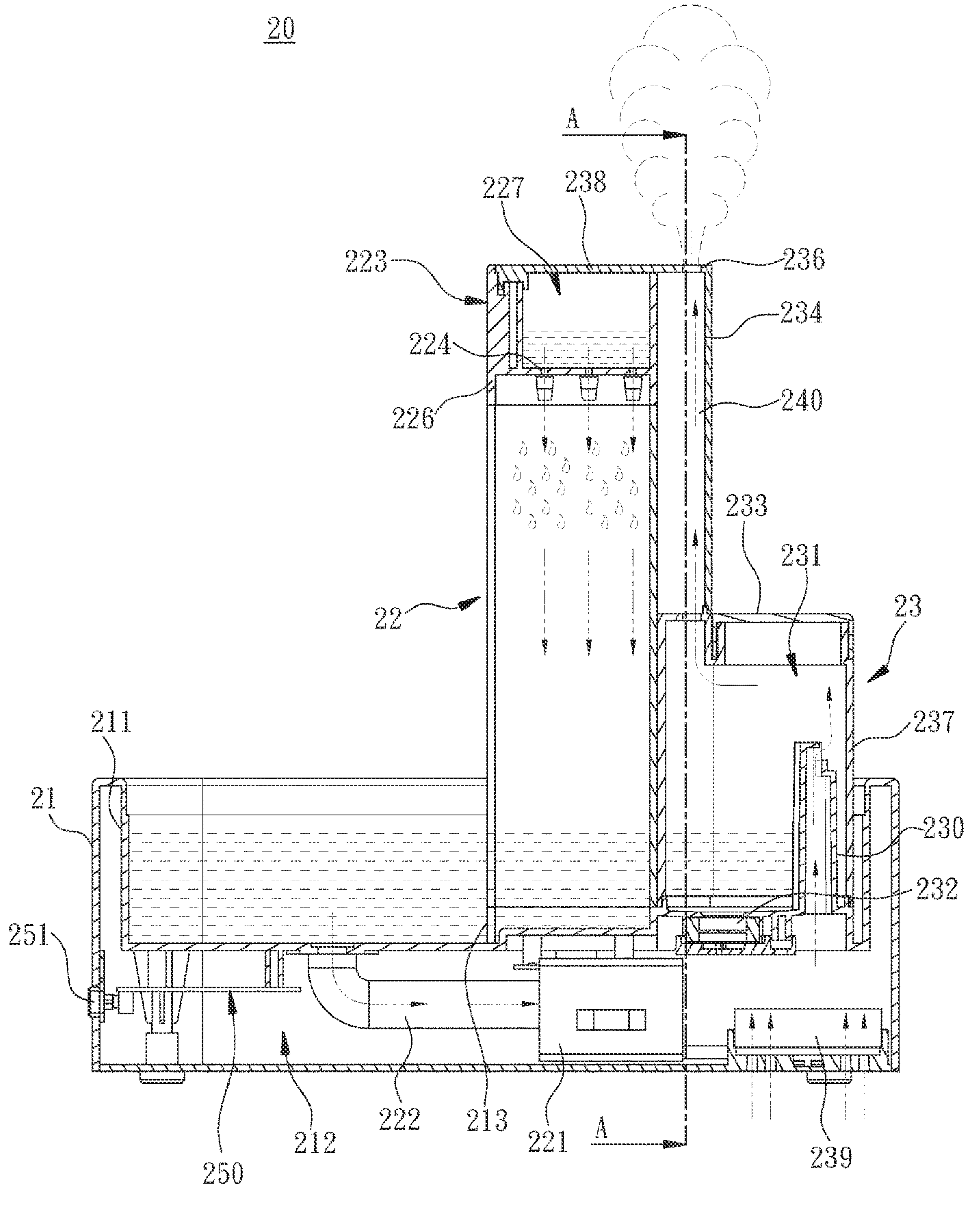
FIG. 4 is a second structural cross-sectional view of an embodiment of the humidifier of the invention.

Please refer to FIG. 2, FIG. 3, and FIG. 4 again. In one embodiment, the water flow assembly 223 comprises two upright columns 225 and a lateral frame 226. The lateral frame 226 connects with the two upright columns 225. One of the water conduits 222 extends in one of the two upright columns 225. Further, the two upright columns 225 can be hollow in design. In one embodiment, the lateral frame 226 can span across the two upright columns 225. In addition to forming the at least one water outlet 224, the lateral frame 226 further forms a water flow space 227 and an interface 228. The water flow space 227 is communicated with the at least one water outlet 224, and the interface 228 is used to connect with one of the water conduits 222 and communicate with the water flow space 227. In this embodiment, the two upright columns 225 and the lateral frame 226 can be detachable components.

Figure 5:
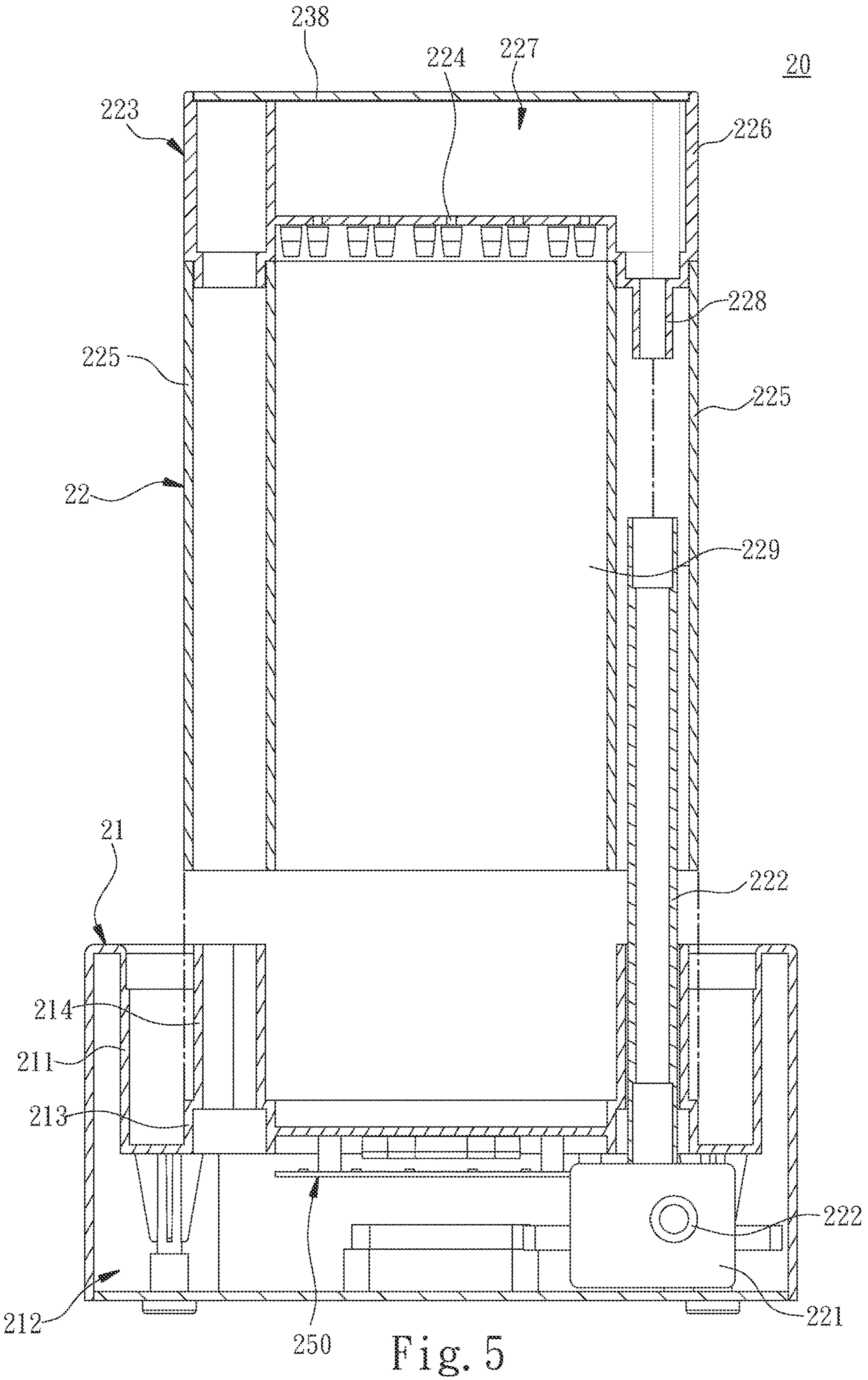
FIG. 5 is a partial structural cross-sectional exploded view of an embodiment of the humidifier of the invention.

Please refer to FIG. 1, FIG. 3 and FIG. 5. In one embodiment, the base 21 comprises at least one boss 213, and the at least one boss 213 is at least provided for assembly of the two upright columns 225. Further, corresponding concave and convex designs can be formed on the at least one boss 213 according to assembly with other structures, for example, two base posts 214 are provided for assembly of each of the two upright columns 225. In one embodiment, the auxiliary water tank 231 is formed jointly by an annular wall 237 stacked on the at least one boss 213 and the boss 213, and the water diversion port 235 is formed on the annular wall 237. Further, since the essential oil needs to be dripped into the auxiliary water tank 231, a position of the water diversion port 235 should not be disposed close to a high water level of the auxiliary water tank 231, or at a high water level sufficient for atomization in order to prevent the essential oil from diffusing into the water tank 211 mistakenly. Furthermore, the boss 213 and the annular wall 237 can be respectively formed with a positioning structure to assist in positioning and assembly of the boss 213 and the annular wall 237.

Figure 6:
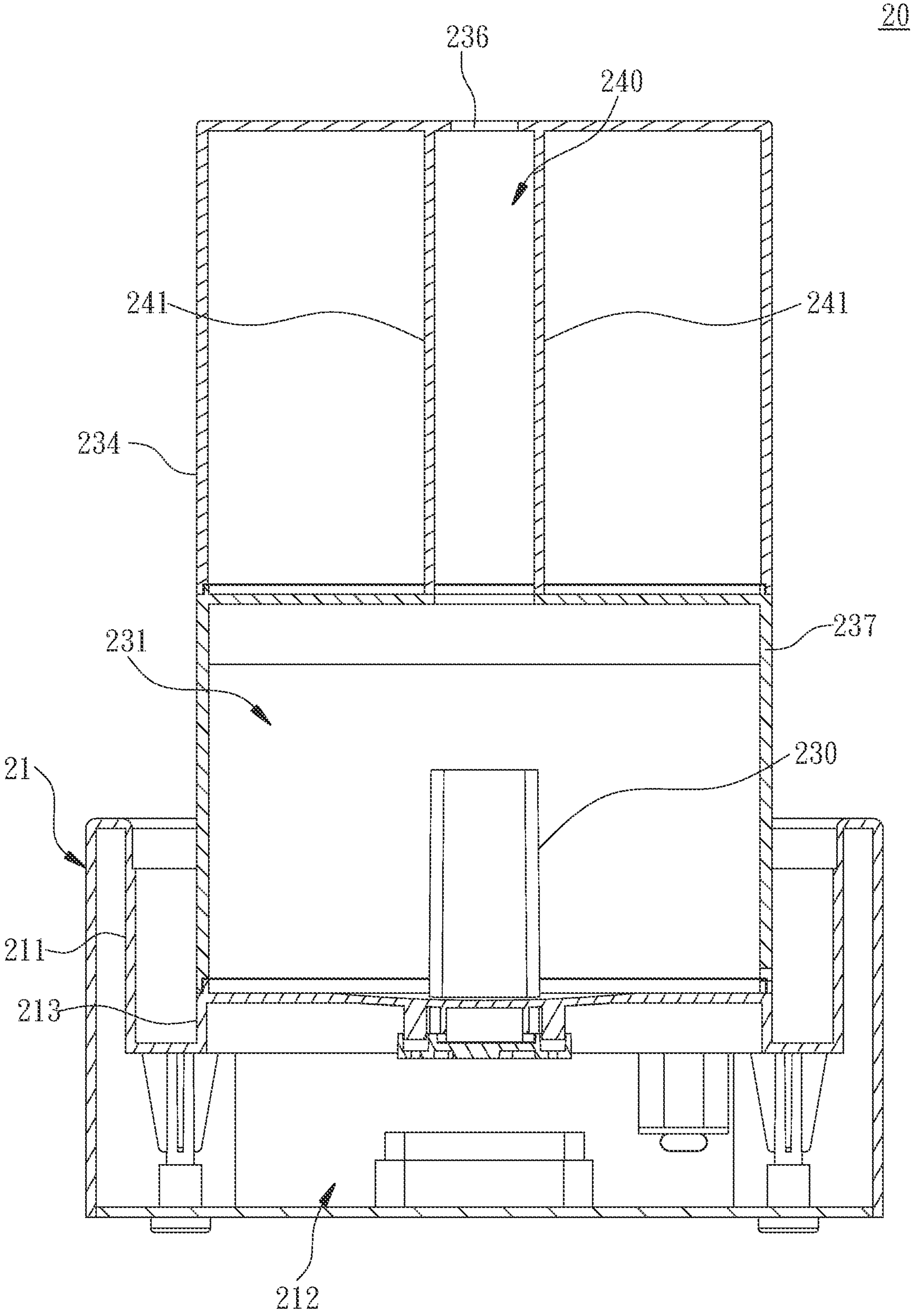
FIG. 6 is a structural cross-sectional view of line segment A-A in FIG. 4.

Please refer to FIG. 2, FIG. 3, and FIG. 4 again. In one embodiment, the water flow assembly 223 comprises a partition wall 229, and the partition wall 229 is formed on the two upright columns 225. The gas guide member 234 is a half shell. The gas guide member 234 and the partition wall 229 jointly define an exhaust channel 240. The exhaust channel 240 is communicated with the auxiliary water tank 231 and uses the at least one exhaust port 236 as an outlet. Please refer to FIG. 6. In one embodiment, the gas guide member 234 is formed with at least two ribs 241 on one side predetermined to face the partition wall 229. The at least two ribs 241 further limit the exhaust channel 240 to be formed by a space between the at least two ribs 241, thereby enhancing circulation of an atomized gas.

Please refer to FIG. 2, FIG. 3, and FIG. 4 again. In one embodiment, the water flow space 227 of the lateral frame 226 is tank-shaped. The gas guide member 234 is formed with a shield 238, and the shield 238 is used to cover the water flow space 227. In this embodiment, a number of components of the humidifier 20 is reduced through the aforementioned design Please refer to FIG. 2 and FIG. 3 again. In one embodiment, the humidifier 20 comprises a work management component 250. The work management component 250 is disposed in the equipment installation space 212. The work management component 250 at least has a power regulation function. The work management component 250 obtains electric power required for operation from a battery, a mains power or a power converter, and supplies electric power required for operation to components that need it. The work management component 250 connects with the water pump 221 and the atomizer 232. Furthermore, the work management component 250 can be further provided with a control chip, through the control chip controllability of the humidifier 20 can be enhanced. In one embodiment, the humidifier 20 comprises a plurality of switches 251. The switches 251 are provided on the base 21. The switches 251 are used to generate at least one signal to control operation of the fountain unit 22 and the humidification unit 23. The switches 251 are connected to the work management component 250 to enable the work management component 250 to activate the corresponding unit based on the at least one signal. In one embodiment, one of the switches 251 can be used to adjust a mist amount.

Please refer to FIG. 2 and FIG. 3 again. In one embodiment, the humidification unit 23 comprises an air flow generating member 239 and a ventilation pipe 230. The air flow generating member 239 is disposed in the equipment installation space 212, and the air flow generating member 239 is further connected to the work management component 250 to be controlled by the work management component 250. The ventilation pipe 230 is located in the auxiliary water tank 231. One end of the ventilation pipe 230 corresponds to the air flow generating member 239, and another end thereof is located in the auxiliary water tank 231. When the air flow generating member 239 is working, gas flow will be generated in the auxiliary water tank 231 through the ventilation pipe 230, so that an atomized gas can be discharged through the gas guide member 234.

What is claimed is:

1. A humidifier with fountaining and aroma diffusing functions, comprising a base, provided with a water tank and an equipment installation space;

a fountain unit, comprising a water pump disposed in the equipment installation space, a plurality of water conduits connected to the water pump, and a water flow assembly located in the water tank, one of the plurality of water conduits leading water from the water tank, another one of the plurality of water conduits extending to reach the water flow assembly, the water flow assembly comprising at least one water outlet that receives water and discharging the water toward the water tank, a height level of the at least one water outlet being higher than a height level of the water tank; and a humidification unit, comprising an auxiliary water tank placed in the water tank, an atomizer disposed in the equipment installation space and partially exposed in the auxiliary water tank, a cap provided on the auxiliary water tank, and a gas guide member disposed corresponding to the auxiliary water tank and communicating with a space in the auxiliary water tank, the auxiliary water tank comprising a water diversion port communicating with a space inside the water tank, the auxiliary water tank configured to provide for dripping at least one essential oil therein, the gas guide member comprising at least one exhaust port, and an exhaust direction of the at least one exhaust port being divergent from a water flow direction of the at least one water outlet.

2. The humidifier with fountaining and aroma diffusing functions as claimed in claim 1, wherein the water flow assembly comprises two upright columns and a lateral frame connecting with the two upright columns, one of the water conduits extends in one of the two upright columns, the lateral frame forms the at least one water outlet, a water flow space communicated with the at least one water outlet, and an interface for connecting with one of the water conduits and communicating with the water flow space.

3. The humidifier with fountaining and aroma diffusing functions as claimed in claim 2, wherein the base comprises at least one boss for providing assembly of the two upright columns.

4. The humidifier with fountaining and aroma diffusing functions as claimed in claim 3, wherein the auxiliary water tank is formed jointly by an annular wall stacked on the at least one boss and the boss, and the water diversion port is formed on the annular wall.

5. The humidifier with fountaining and aroma diffusing functions as claimed in claim 4, wherein the water flow assembly comprises a partition wall formed on the two upright columns, the gas guide member is a half shell, and the gas guide member and the partition wall jointly define an exhaust channel communicated with the exhaust port.

6. The humidifier with fountaining and aroma diffusing functions as claimed in claim 5, wherein the water flow space of the lateral frame is tank-shaped, and the gas guide member is formed with a shield covering the water flow space.

7. The humidifier with fountaining and aroma diffusing functions as claimed in claim 1, wherein the humidifier comprises a work management component disposed in the equipment installation space and connected to the water pump and the atomizer.

8. The humidifier with fountaining and aroma diffusing functions as claimed in claim 7, wherein the humidification unit comprises an air flow generating member disposed in the equipment installation space, and a ventilation pipe located in the auxiliary water tank, one end of the ventilation pipe corresponds to the air flow generating member, and another end thereof is located in the auxiliary water tank.

9. The humidifier with fountaining and aroma diffusing functions as claimed in claim 7, wherein the humidifier comprises a plurality of switches provided on the base, and the switches are used for generating at least one signal to control operation of the fountain unit and the humidification unit.

* * * * *